(12) United States Patent
Kerlau et al.

(10) Patent No.: US 6,578,721 B1
(45) Date of Patent: Jun. 17, 2003

(54) PIVOTED ARM FOR LOWERING UNDER A SLAB

(75) Inventors: Daniel Kerlau, Malabry (FR); Bruno Jullienne, Montrouge (FR)

(73) Assignee: Compagnie Generale des Matieres, Velizy-Villacoublay (FR)

( * ) Notice: Subject to any disclaimer, the term of this patent is extended or adjusted under 35 U.S.C. 154(b) by 0 days.

(21) Appl. No.: 09/743,651
(22) PCT Filed: May 17, 2000
(86) PCT No.: PCT/FR00/01326
§ 371 (c)(1), (2), (4) Date: Mar. 28, 2001
(87) PCT Pub. No.: WO00/69769
PCT Pub. Date: Nov. 23, 2000

(30) Foreign Application Priority Data

May 18, 1999 (FR) .............................. 99 06286

(51) Int. Cl.⁷ ............................................. G21C 19/00
(52) U.S. Cl. ...................................... 212/179; 376/270
(58) Field of Search ........................... 212/179; 376/270

(56) References Cited

U.S. PATENT DOCUMENTS

| | | | | |
|---|---|---|---|---|
| 4,158,309 A | * | 6/1979 | Elsner et al. ................. 73/641 |
| 4,179,035 A | * | 12/1979 | Francois et al. ................ 414/2 |
| 4,220,170 A | * | 9/1980 | Hebert et al. ............ 134/167 R |
| 4,501,522 A | * | 2/1985 | Causer et al. .................... 414/4 |
| 4,663,114 A | * | 5/1987 | Cransac et al. .............. 376/271 |
| 4,805,650 A | * | 2/1989 | Yasui et al. ................ 134/57 R |
| 4,897,240 A | * | 1/1990 | Sako .......................... 376/328 |
| 5,151,245 A | * | 9/1992 | De Seroux et al. ......... 376/271 |
| 5,601,051 A | * | 2/1997 | Bajek .......................... 118/306 |
| 5,762,467 A | * | 6/1998 | Sturm et al. ................. 414/729 |
| 5,787,137 A | * | 7/1998 | Nelson et al. ............... 376/249 |
| 5,913,320 A | * | 6/1999 | Varrin et al. ............. 134/22.18 |
| 6,145,517 A | * | 11/2000 | Mancuso .................... 134/22.1 |
| 6,213,134 B1 | * | 4/2001 | Pike ....................... 134/166 R |

FOREIGN PATENT DOCUMENTS

EP 701965 * 3/1996
JP 9-188290 * 7/1997

* cited by examiner

Primary Examiner—Thomas J. Brahan
(74) Attorney, Agent, or Firm—Pearne & Gordon LLP

(57) ABSTRACT

An instrument (1) is lowered into a tank with a narrow opening (4) guided by an articulated arm (11) mounted on a mobile trolley on the periphery of the opening. The rotation of the arm consecutive to this movement and the pivoting of the lower section (13) around the articulation (14) place the instrument (1) vertically above the required place, by means of a simple control if expressed in polar co-ordinates. Application to taking samples and inspections in tanks containing dangerous waste.

11 Claims, 4 Drawing Sheets

PIVOTED ARM FOR LOWERING UNDER A SLAB

The present invention relates to an articulated arm to be lowered under a slab, through an opening in the latter, in order to carry and guide a device or an instrument of any type whatsoever under the slab and laterally to the opening.

It can be applied to taking samples of nuclear waste emptied into special vertical cylindrical tanks, closed at the top by a concrete slab acting as biological protection and pierced by a single central opening, with a small surface area and whose cover is then removed. The sampling procedures existing at present, among which one can mention the use of long rods introduced obliquely into the opening, are not convenient and hardly allow the point of sampling to be chosen with precision. The articulated arm described herein offers, on the other hand, the possibility of easy samplings even at the periphery of the tank, furthest away from the opening, with the advantage that the sampling equipment can be set with great precision and without the need for any delicate or tiring manoeuvring. It is evident that the invention can be applied to other equipment apart from sampling tools, and in particular sensors or measuring equipment.

In its most general form, the invention relates to an articulated arm to be lowered into an opening in a slab acting as cover for a tank, comprising an upper section and a lower section linked together by an articulation, a means of control of an angle formed by the sections, a bearing placed around the opening and comprising a fixed ring integral with the slab and a turning ring integral with the upper section, a means of control for rotating the turning ring, and a tool suspended from the lower section by a cable of variable length.

Thus, a combined movement of rotation of the whole of the arm around the fixed ring and pivoting of the lower section makes it possible to place the free end of the lower section under the desired point of the slab; it then suffices to lower the tool to give it the right height and reach the surface of the waste to be sampled.

In addition, the lower section is formed of two articulated parts, a return pulley is set at the articulation between the sections, a suspension pulley is set at the free end of the lower section and the suspension cable of the tool, which moreover extends above the slab and the arm, passes under the return pulley and over the suspension pulley.

Certain measures, for perfecting the invention, make it possible to maintain an almost perfect seal despite the necessary movements of the arm, to assemble and disassemble the arm quickly and to control the different movements with precision.

The American patent 4 805 650 describes an articulated arm lowered through the opening of the cover of a container and turning to orient an instrument for projecting water in the container; in addition, the instrument can be lowered by releasing its suspension cable.

Nonetheless, it is not indicated whether or not this arm has means for adjusting the angle of the sections at will, in order to carry the end of the tool to a desired radial position, since the lower section remains in a horizontal position resting on a stop, so that the instrument remains close to the wall of the container to be cleaned.

An improvement proposed here consists of designing the lower section of the arm in two parts articulated together. The assembly of the arm on the opening of the slab is thus simplified, since the lower section remains folded against the upper section, taking less space. When the arm has been fixed on the turning ring of the bearing, the lower section is lowered by passing it through the opening in the slab, which is possible since it has not yet been extended; the assembly of the arm is completed by prolonging and locking the two parts of the lower section in the tank. The arm thus passes from a folded state in which it can be easily installed to an extended state where the lower section is long and offers great possibility of access to all positions in the tank. Such a procedure for extension and locking can be accomplished in particular if the parts of the lower section are articulated by an axle situated on their front edges in a direction for pivoting the lower section relative to the upper section, the means of control of the angle formed by the sections comprising a reversible drive, allowing the lower section to be pivoted in two opposite directions, and the parts of the lower section comprising locking means on their rear edges.

The locking means can in particular comprise axles on a first of the sections, notches on the other one of the sections, springs making the axles protrude from the first of the sections towards the other of the sections, and a cable able to be tightened to make the axles fit into the first of the sections.

An embodiment of the invention, which will now be explained with reference to the following drawings, will make it possible to understand better these characteristics and advantages, together with others:

Figure 4:
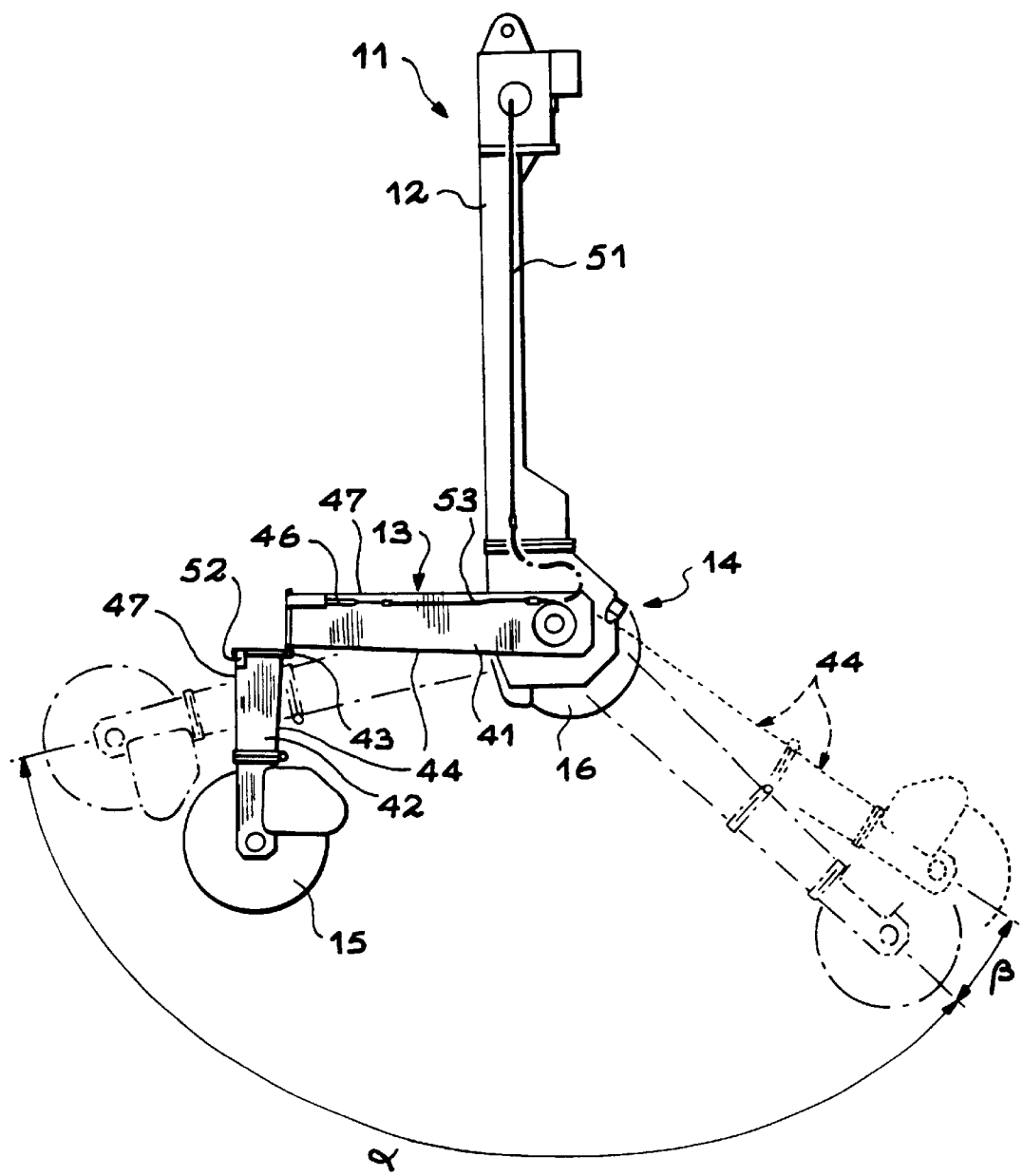

FIG. 4 serves to explain the operation, extension and folding of the arm.

Figure 1:
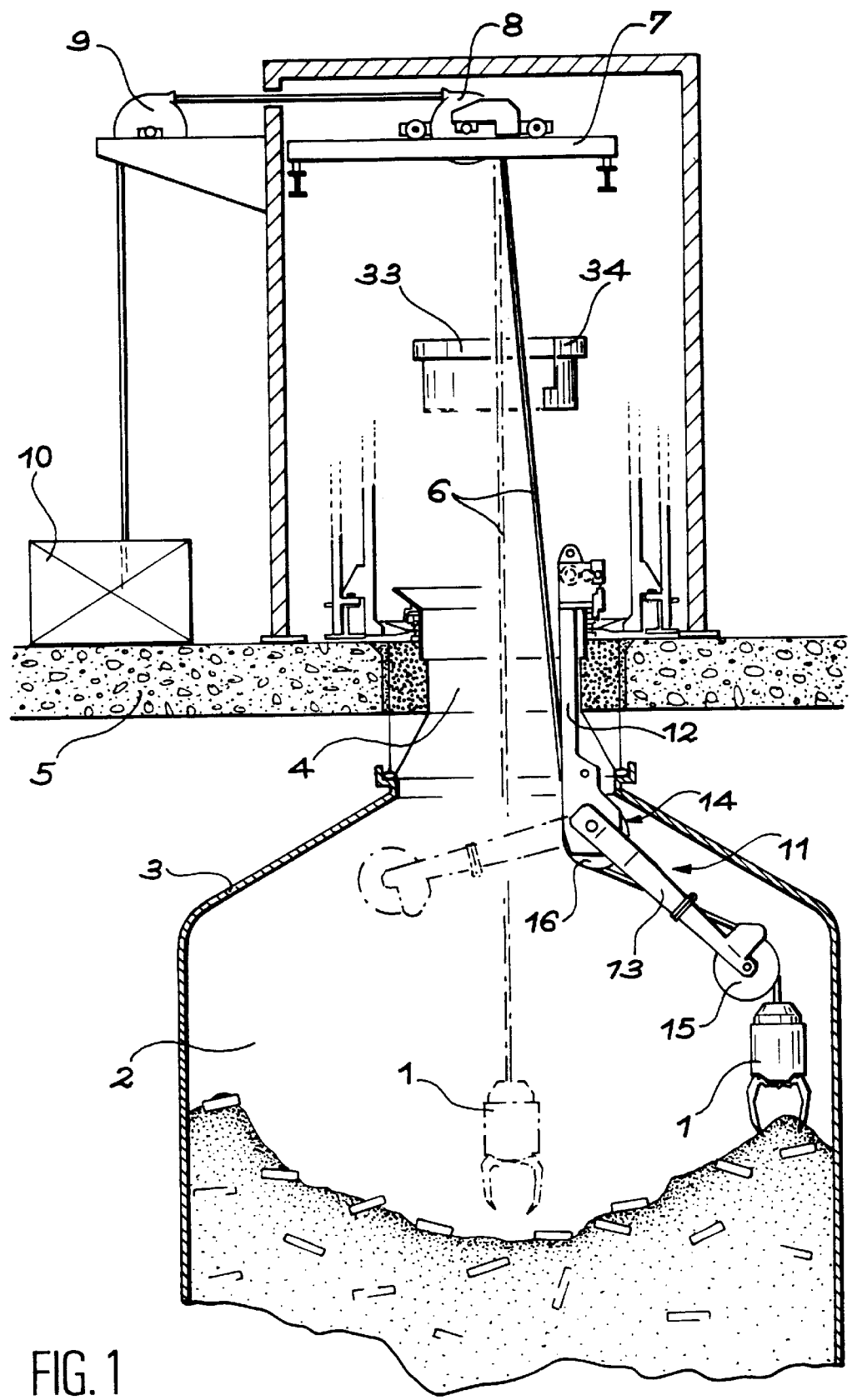
FIG. 1 is a view of the whole of the arm in its place of application.

FIG. 1 is described first. The invention is intended for operating a grab 1 in charge of picking up samples of waste tipped beforehand into a tank 2 of a silo 3 whose shape is roughly that of a bottle, with a narrow opening 4 at the top. A concrete slab 5 covers the silo 3 and protects the outside from the irradiation which might be caused by the waste; however it can be freed at the place of the opening 4.

The grab 1 is suspended from a cable 6 which reaches as high as an overhead crane 7 astride the slab 5 and the opening 4 and a pulley 8 of this crane 7, where it is turned laterally towards a second pulley 9, then towards a motorised winch 10 not shown in detail. This equipment makes it possible to lower the grab 1 down to the surface of the waste but is not able to displace it laterally in the tank 2; the articulated arm described below fills this gap.

It carries the general reference 11 and essentially comprises an upper section 12 lowered through the opening 4 and a lower section 13 linked to the preceding section by an articulation 14 and which extends lower into the tank 2; its free end carries a pulley 15 over which passes cable 6. The grab 1 thus hangs vertically from this pulley 15 and can be set at any position in the tank 2 depending on the angle imposed between sections 12 and 13 by controlling the articulation 14. It is to be noted that the latter is equipped with another pulley 16, under which cable 6 passes so as to maintain it fairly closely in the alignment of each of the sections 12 and 13 and to avoid it rubbing against the edge of the opening 4.

Figure 2:
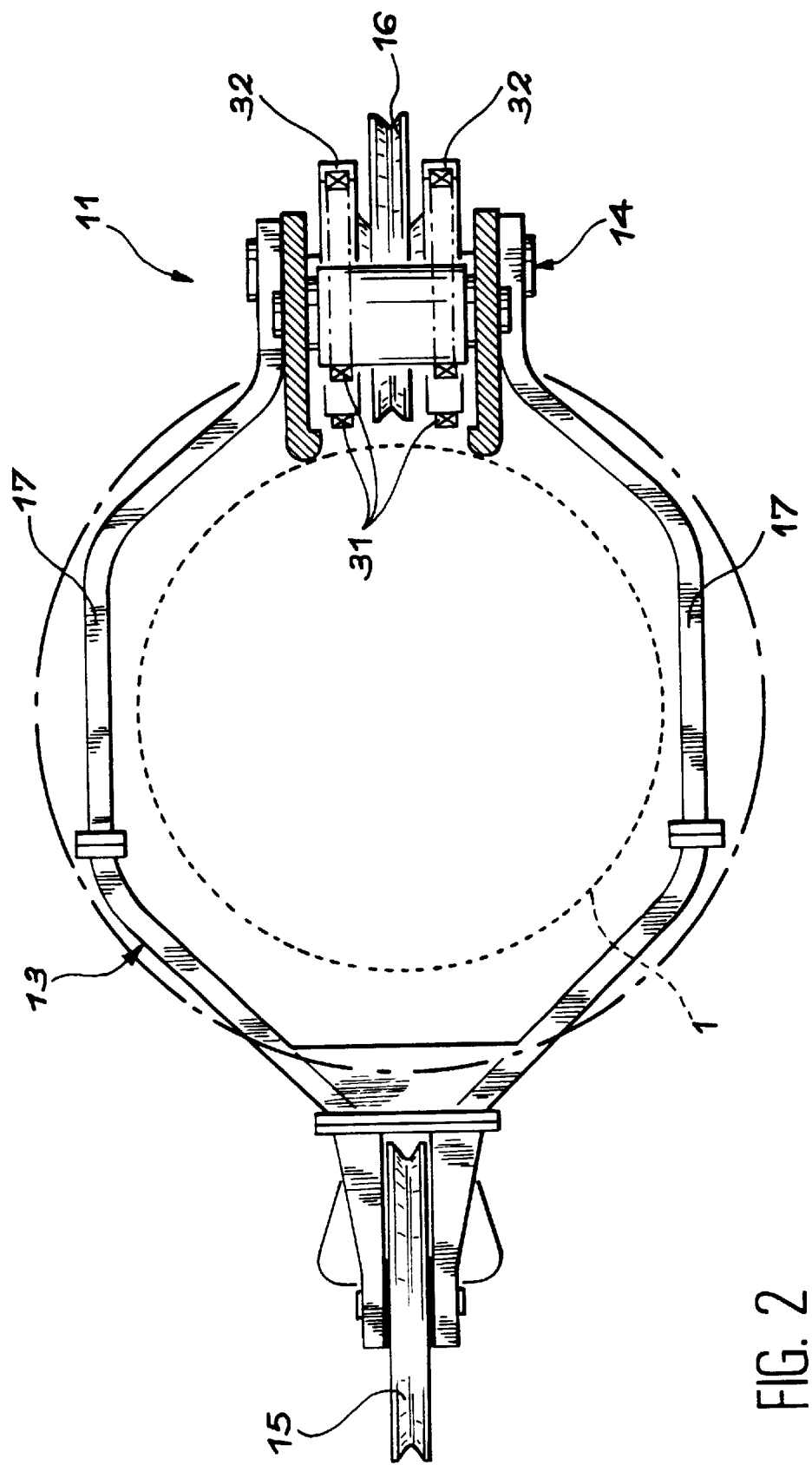
FIG. 2 is a cross-section of the arm at the articulation between the sections.

Referring to FIG. 2, it can be seen that the lower section 13 consists of two parallel girders 17 whose spacing is sufficient to allow the grab 1 to be lowered between them (its external outline is marked). The articulation 14 is oriented in such a way that the lower section pivots in the vertical and radial planes (passing along the central axis of the opening 4).

Figure 3:
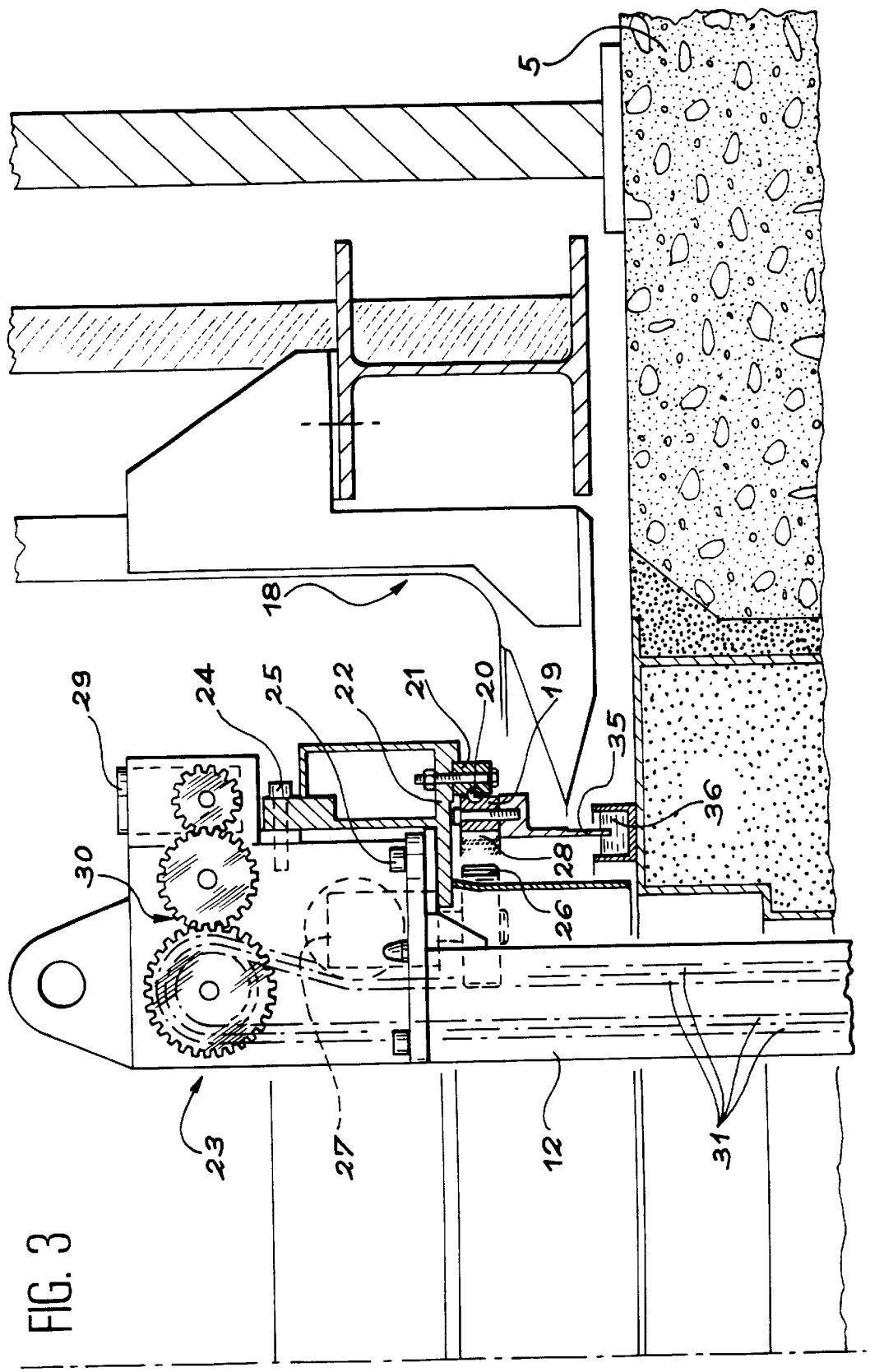
FIG. 3 represents in detail the upper part of the arm and its assembly means.

Referring now to FIG. 3, it can be seen that slab 5 carries a frame 18 around the opening 4, which comprises in particular a fixed ring 19 with ball-bearings 20, whose other ring 21, turning, is integral with a crown 22 on which the support structure 23 can be set and fixed by a circle of lateral screws 24 and vertical screws 25. The arm 11 is suspended from the support structure 23. A pinion gear 26 of a drive motor 27 fixed on the support structure 23 then engages with a toothed crown 28 cut on the internal surface of the fixed ring 19: it results from this construction that starting up the motor 27 displaces the pinion 26 and consequently the support structure 23 and the articulated arm 11 as a whole along the toothed wheel 28 and around the opening 4, which places the lower section 13 and the grab 1 in the angular direction required. The support structure 23 comprises another motor 29, which moves a series of gears 30 and displaces an endless chain 31 at its end; the chain 31 extends along the upper section 12 as far as a pinion 32 set at the articulation 14 and integral with the lower section 13: this is the mechanism which varies the angle of articulation 14 and displaces the lower section 13 and the pulley 15 towards the walls of the silo 2 by the amount required. FIG. 2 shows that the chain 31 and the pinion 32 can be double and located on either side of the articulation pulley 16, which balances the efforts of the girders 17. The chain 31 presents the advantages over other drives of resisting mechanical strains and irradiation better, and the possibility of being assembled and disassembled quickly.

In FIG. 1 a plug 33 in two parts is to be noted, the smallest of which 34 has the cross-section of the upper section 12; the plug 33 is installed over the opening 4 to close it, completely in the absence of the articulated arm 11, but with the part 34 taken off when the articulated arm 11 is placed through the opening 4 and left immobile; it then adjusts itself around the upper section 12 and maintains an almost perfect seal. Another precaution for maintaining the seal around the opening 4 consists of adding a metallic skirt 35, circular and continuous under the fixed ring 19 with the base dipped into liquid poured into a circular metallic groove 36 with cross-section in the shape of a trough and which is fixed on the slab 5 around the opening 4 (FIG. 3).

The assembly begins by installing the frame 18 and the crown 22 around the opening 4, then the articulated arm 11 is lowered through the opening 4 and its support structure 23 is screwed to the crown 22. The lower section 13 is pivoted to the back, in an almost horizontal position, directed towards the left, as represented by dots and dashes in FIG. 1, before lowering the grab 1 and passing it between the girders 17. An opposite pivoting of the lower section 13, towards the front, makes it possible for the suspension pulley 15 to intercept and catch the cable 6. The grab 1 is finally brought above the desired point in the tank to take a sample, by displacing the articulated arm 11 around the opening 4 to place the lower section 13 at the orientation desired and making it pivot to place the grab 1 at the distance desired from the opening 4 to thus provide guidance in polar coordinates. The ability to force the pivoting backwards, for the passage of the grab 1, and forwards for guiding it, is an important aspect of the device, due to the control reversibility of the movement by the chain 31.

It is indicated that the lower section 13 is to be constructed in two parts articulated together, which will now be described referring to FIG. 4. These two parts carry the references 41 and 42 and are linked together by an articulation axle 43 placed between their front edges 44. During the descent and the assembly of the arm 11 they are folded against each other and against the upper section 12, the upper part 41 then being directed upwards and the whole of the articulated arm 11 forming roughly an "N" with moderate height. When the articulated arm 11 has been assembled, the lower section 13 is lowered into the tank 2 while pivoting; the upper part 41, fairly short, passes freely through the opening 4. The parts 41 and 42 end up by being extended and touch each other, after which they can be locked. A locking system proposed here comprises at least one pin 46 set at the bottom of the upper part 41, near to the rear edge 47, opposite the articulation 43. The pin 46 is directed downwards, and pushed in this direction by a spring, not shown, which makes it protrude outside the upper part 41. But the action of the spring is countered by a cable 51 hooked at the back of the pin 46 and which extends first of all around the articulation pulley 16, then along the upper section 12 before ending above the slab 5. The cable 51 can be caught by a telemanipulator or otherwise, and pulled to overcome the action of the spring 48 and return the pin 46 into the upper part 41 of the lower section 13. This is what is done when the parts 41 and 42 are extended at assembly, so that the pin 46 does not interfere with the approach of the rear edges 47 of the two parts 41 and 42; then the cable 51 is released so that the pin 46 protrudes from the upper section 41 and enters a notch 52 made in the lower part 42 and which then opens in front of it. The pin 46 now becomes integral with the parts 41 and 42 and counteracts any rotation around the articulation 43 until the cable 51 is pulled again.

The locking and unlocking action can be made automatic so as not to rely on a cable 51 ending outside the opening 4 and thus susceptible to compromising the seal. The cable used then corresponds only to the rear portion 53 of the cable 51, which is hooked at its end opposite to the pin 46 to an articulation point 14 linked to the upper section 12 in such a way that, when the upper section 13 pivots to its maximum, the cable portion 53 winds itself up around the articulation 14, stretches itself and pulls the pin 46 in the same way as before; the cable portion 53 extends when the lower section 13 is sent slightly lower, which releases the pin 46 and makes it possible for it to enter the notch 52 and to ensure the linkage between the parts 41 and 42 as before.

The tension of the portion of cable 53 is only produced in the extreme pivoting positions towards the front, in the angle β in FIG. 4. The angle α corresponds to the pivoting range in which the cable 53 is released and or the locking of the parts 41 and 42 can be maintained.

A cam, not shown but of the generally known type, and which is put into movement by the tension of the cable portion 53, makes it possible alternatively to let pin 46 protrude or to maintain it within the part 41 once the cable portion 53 has been released, and thus either to lock the parts 41 and 42, or not.

Thus it suffices to bring the lower section 13 to its extreme front position in the angle β after assembling the articulated arm 11 to lock the parts 41 and 42, then to bring it back once to control the unlocking at the end of operations, and the parts 41 and 42 fold together as soon as the lower section 13 is brought backwards past the vertical. The articulated arm 11 can then be dismantled from the opening 4. The grab 1 has been lifted and taken away before unlocking and after moving the lower section 13 backwards, in extension position for the parts 41 and 42, to free the cable 6.

What is claimed is:
1. An articulated arm (11) to be put through an opening (4) of a slab (5) acting as cover for a tank (2), comprising an upper section (12) and a lower section (13) linked together by an articulation (14), a bearing placed around the opening and comprising a fixed ring (19), integral with the slab, and a turning ring (21), integral with the upper section (12), means (26, 27, 28) of control of the rotation of the turning ring, a tool (1) suspended from the lower section by a cable (6) of variable length, which extends above the slab and the arm and over a suspension pulley (15) to a free end of the lower section (13), a return pulley (16) set at the articulation of the sections, the cable passes under the return pulley (16) wherein the lower section is formed of two articulated parts (41, 42) and there are means of control (29 to 32) of an angle formed by the sections, the lower section is pivotable in vertical planes either in a back direction, or in a front direction in which the suspension pulley intercepts and catches the cable, and the lower section comprising girders (17) leaving a cross-section for passage of the tool when the lower section is pivoted in the back direction.

2. An articulated arm according to claim 1, characterized in that the parts of the lower section are articulated by an axle (43) situated on the front edges (44) in a pivoting direction of the lower section (13) relative to the upper section, and the parts of the lower section comprise locking means on their rear edges.

3. An articulated arm according to claim 1, characterized in that the means of control for rotating the turning ring comprise a gear with drive pinion (26) and toothed crown (28), the pinion and the crown being integral with one, respectively, of the rings.

4. An articulated arm according to claim 1, characterized in that the upper section (12) comprises a support structure (22) which can be screwed to the turning ring.

5. An articulated arm according to claim 1, characterized in that it comprises a plug (33), mounted on the turning ring and closing the opening, provided with a detachable part (34) for passage of the upper section.

6. An articulated arm according to claim 1, characterized in that it comprises a sealing joint composed of a continuous skirt (35) under the fixed ring (19) with its lower edge dipping into liquid filling a groove (36) surrounding the opening.

7. An articulated arm (11) to be put through an opening (4) of a slab (5) acting as cover for a tank (2), comprising an upper section (12) and a lower section (13) linked together by an articulation (14), a bearing placed around the opening and comprising a fixed ring (19), integral with the slab, and a turning ring (21), integral with the upper section (12), means (26, 27, 28) of control of the rotation of the turning ring, a tool (1) suspended from the lower section by a cable (6) of variable length, which extends above the slab and the arm and over a suspension pulley (15) to a free end of the lower section (13), a return pulley (16) set at the articulation of the sections, the cable passes under the return pulley (16) wherein there are means of control (29 to 32) of an angle formed by the sections, the lower section is pivotable in vertical planes either in a back direction, either in a front direction in which the suspension pulley intercepts and catches the cable, and the lower section comprising girders (17) leaving a cross-section for passage of the tool when the lower section is pivoted in the back direction.

8. An articulated arm according to claim 7, characterized in that the means of control for rotating the turning ring comprise a gear with drive pinion (26) and toothed crown (28), the pinion and the crown being integral with one, respectively, of the rings.

9. An articulated arm according to claim 7, characterized in that the upper section (12) comprises a support structure (22) which can be screwed to the turning ring.

10. An articulated arm according to claim 7, characterized in that it comprises a plug (33), mounted on the turning ring and closing the opening, provided with a detachable part (34) for passage of the upper section.

11. An articulated arm according to claim 7, characterized in that it comprises a sealing joint composed of a continuous skirt (35) under the fixed ring (19) with its lower edge dipping into liquid filling a groove (36) surrounding the opening.

* * * * *

UNITED STATES PATENT AND TRADEMARK OFFICE
CERTIFICATE OF CORRECTION

PATENT NO. : 6,578,721 B1
DATED : June 17, 2003
INVENTOR(S) : Daniel Kerlau et al.

It is certified that error appears in the above-identified patent and that said Letters Patent is hereby corrected as shown below:

<u>Title page,</u>
Item [73], Assignee, please delete "Compagnie Generale des Matieres", and insert therefor -- Compagnie Generale des Matieres Nucleaires --.

Signed and Sealed this

Sixth Day of January, 2004

JAMES E. ROGAN
*Director of the United States Patent and Trademark Office*